C. B. HAINES.
DIRECTION INDICATOR HANGER FOR VEHICLES.
APPLICATION FILED JULY 16, 1914.
1,170,062. Patented Feb. 1, 1916.
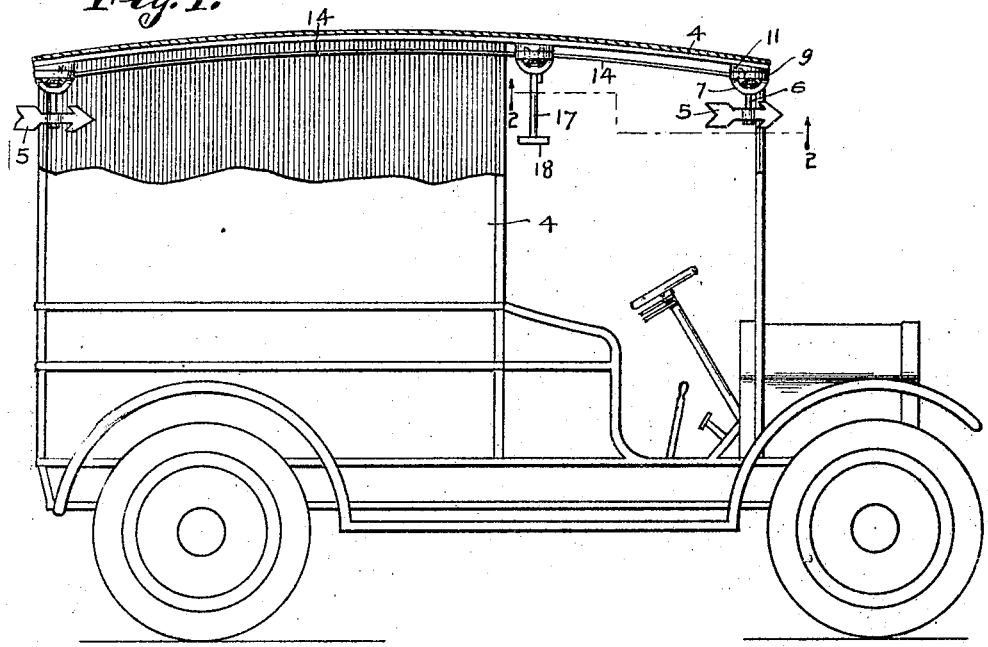
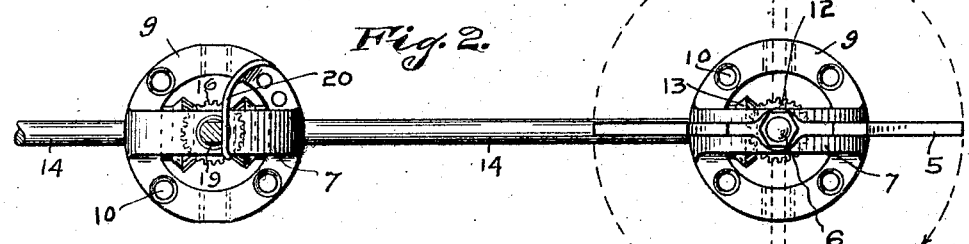
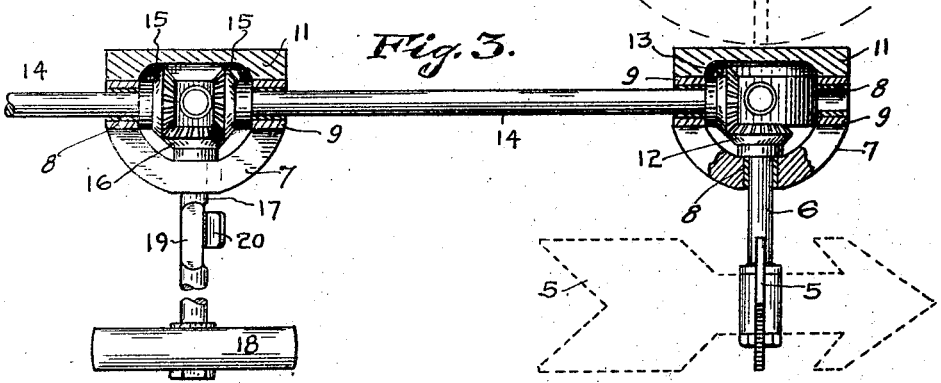
WITNESSES:
L. B. Worner
D. L. Larson
INVENTOR:
Charles B. Haines,
By Minturn & Worner
Attorneys.

UNITED STATES PATENT OFFICE.

CHARLES B. HAINES, OF INDIANAPOLIS, INDIANA.

DIRECTION-INDICATOR HANGER FOR VEHICLES.

1,170,062.   Specification of Letters Patent.   Patented Feb. 1, 1916.

Application filed July 16, 1914. Serial No. 851,393.

*To all whom it may concern:*

Be it known that I, CHARLES B. HAINES, a citizen of the United States, residing at Indianapolis, in the county of Marion and State of Indiana, have invented certain new and useful Improvements in Direction-Indicator Hangers for Vehicles, of which the following is a specification.

This invention, while applicable to vehicles of various kinds, is particularly intended for automobiles, motor trucks, and the like, operating on city streets, and the object of the invention is to provide an indicator which will inform the corner policeman, drivers of other vehicles and pedestrians of the direction in which the vehicle carrying the indicator is going, that is, whether the driver intends to continue straight ahead or to turn to the right or to the left.

A further object is to provide a simple, inexpensive and durable indicator or signaling device which can be applied as an attachment to vehicles already built and in use.

I accomplish the objects of the invention by the mechanism illustrated in the accompanying drawing, in which—

Figure 1 is a view in side elevation and partial longitudinal vertical section of an auto-wagon with my invention applied thereto and set to show that the vehicle will continue straight ahead. Fig. 2 is a section on the line 2—2 of Fig. 1, and Fig. 3 is a longitudinal vertical section and side elevation of the same parts illustrated in Fig. 2 showing the indicator set to show that the vehicle will turn to the right.

Like characters of reference indicate like parts throughout the several views of the drawing.

While I have shown the device as being installed inside of a covered auto-wagon or truck, it should be understood that it is applicable to all forms of vehicles, and if they are not provided with suitably constructed tops of a stationary character supports for the purpose of elevating the signaling devices so as to make them suitably conspicuous may be provided. With this understanding, 4 is a vehicle top to the underside roof of which my invention is fastened. The indicator proper comprises an arrow 5, preferably made out of sheet metal of a size to be readily distinguishable to outside persons within a radius of two or three hundred feet of it. This indicator 5 is secured to the lower end of a vertical rod 6, and the rod is supported by a hanger 7, here shown as a semi-annular metal bar of sufficient thickness to permit a hole to be formed through it to receive the rod 6 which is passed through said opening and is journaled therein. A bushing of anti-friction metal 8 will preferably be installed in the opening around the rod 6. The hanger 7 will be integral with an annular body 9 which has vertical holes 10 to receive screws or bolts by which the body is fastened to its support, which in this case is the roof of the vehicle top. A wooden block 11 shaped on its upper face to conform to the curvature of the roof, where the latter is curved, in order to make the body 9 parallel with the bottom of the vehicle, may be interposed between the body 9 and roof where needed. A similar indicating device will preferably be installed at the rear as well as at the front of the vehicle, and by partially rotating the shafts 6 the arrows of the two indicators may be turned to point, in the direction which the vehicle is to take. Thus, for example, if the direction is to be straight ahead then both arrows will be turned with their heads pointing in that direction, and if the driver intends to turn to the right at the next corner or turn of the road the arrow heads will be turned to the right to indicate that purpose, or, if he intends to turn to the left then the heads of the arrows will be turned in that direction for the same reason.

I will now describe the mechanism by which the front and rear arrows will be simultaneously turned, and by which this adjustment may be conveniently made by the driver. Mounted on the upper ends of the shafts 6 and supported upon their respective hangers 7 are bevel gear wheels 12 which mesh with bevel gear wheels 13 mounted on the adjacent ends of a shaft 14 connecting the front and rear indicating mechanism. The ends of shaft 14 pass through suitable openings formed in the body 9, as shown. This shaft is divided transversely into two members, and the ends pass through openings in a body 9 identical with the bodies supporting the arrows, already described, and mounted on the ends of the shaft members 14 are bevel wheels 15 which mesh with the teeth of a bevel wheel 16 mounted on the hanger 7 on the upper end of a vertical shaft 17. The shaft 17 terminates with a handle 18 within easy reach of the driver of the vehicle and places the means at his command for rocking the shaft 17, and, by the aid of the above described connecting mechanism, for simultaneously rocking the shafts 6 at both ends of the vehicle so as to point the arrows of the indicator at both ends of the vehicle, in the desired direction. As a means of holding the shaft 17 in a given position, and against accidental rocking movement, which will in turn maintain the indicating arrows 5 in their given position, I flatten the shaft 17 on three sides 19 and provide a spring plate 20, which is secured to the body 9, as shown in Fig. 2, to bear against one of the flattened sides 19 of said shaft.

In order to make the hangers 7 and bodies 9 interchangeable I prefer to provide shaft openings through diametrically opposite sides of the body 9, as shown. I also provide the body 9 with a second set of openings 21 at right angles to the openings already described for use in case it is desired to assemble one of the shaft members at right angles to the other member instead of in alinement with it, which change may be required with some forms of vehicles.

While I have described my invention with more or less minuteness as regards details of construction and arrangement and as being embodied in certain precise forms, I do not desire to be limited thereto unduly or any more than is pointed out in the claim. On the contrary, I contemplate all proper changes in form, construction, and arrangement, the omission of immaterial elements, and the substitution of equivalents, as circumstances may suggest or necessity render expedient.

I claim:—

In a hanger for vehicle direction indicator shafts, an annular body secured to the vehicle having shaft-journal openings in a plurality of directions, and a semi-annular depending member having a shaft-journal opening extending substantially at right angles to the plane of the journal openings in the annular body.

In witness whereof, I have heretofore set my hand and seal at Indianapolis, Indiana, this 6th day of July, A. D. one thousand nine hundred and fourteen.

CHARLES B. HAINES. [L. S.]

Witnesses:
J. A. MINTURN,
I. L. LARSON.